United States Patent
Liu

(10) Patent No.: US 6,980,269 B2
(45) Date of Patent: Dec. 27, 2005

(54) ROUGHNESS REFLECTIVE LAYER FOR PIXEL DESIGNED THIN FILM TRANSISTOR AND LIQUID CRYSTAL DISPLAY

(75) Inventor: Hong-Da Liu, Chu Pei (TW)

(73) Assignee: M-Display Optronics Corp., Hsinchu Hsien (TW)

( * ) Notice: Subject to any disclaimer, the term of this patent is extended or adjusted under 35 U.S.C. 154(b) by 0 days.

(21) Appl. No.: 10/449,936

(22) Filed: May 30, 2003

(65) Prior Publication Data

US 2004/0021812 A1     Feb. 5, 2004

(30) Foreign Application Priority Data

Jul. 30, 2002   (TW) ................. 91117087 A

(51) Int. Cl.[7] ............................................ G02F 1/1335
(52) U.S. Cl. ....................... 349/114; 349/113; 349/117
(58) Field of Search ......................... 349/113, 114, 117

(56) References Cited

U.S. PATENT DOCUMENTS

| | | | |
|---|---|---|---|
| 5,859,683 A * | 1/1999 | Tagusa et al. ............... | 349/138 |
| 6,310,674 B1 * | 10/2001 | Suzuki et al. ............... | 349/139 |
| 6,433,842 B1 * | 8/2002 | Kaneko et al. .............. | 349/43 |
| 6,522,370 B2 * | 2/2003 | Takahashi et al. ........... | 349/43 |
| 6,680,765 B1 * | 1/2004 | Maeda et al. ............... | 349/117 |
| 6,731,359 B1 * | 5/2004 | Fukaya ....................... | 349/112 |
| 2001/0008437 A1 * | 7/2001 | Fujimori et al. ............ | 349/113 |
| 2003/0128315 A1 * | 7/2003 | Tashiro et al. ............. | 349/113 |
| 2003/0142255 A1 * | 7/2003 | Ishii et al. ................... | 349/113 |
| 2003/0214718 A1 * | 11/2003 | Kaminsky et al. .......... | 359/599 |
| 2004/0021810 A1 * | 2/2004 | Kawaguri et al. .......... | 349/113 |
| 2004/0151895 A1 * | 8/2004 | Itoh et al. ................... | 428/327 |

* cited by examiner

Primary Examiner—Dung T. Nguyen
Assistant Examiner—Mike Qi
(74) Attorney, Agent, or Firm—Dickinson Wright PLLC

(57) ABSTRACT

A thin-film transistor and a liquid crystal display having an ultra minimal rough reflective layer on pixel design are described. An ultra minimal rough reflective layer with an ultra minimal rough surface is formed on a substrate. The ultra minimal rough reflective layer includes an amorphous or partial crystalline indium tin oxide layer and a silicon-containing rugged layer to form the ultra minimal rough surface. A reflective layer conformal to the rugged layer is then formed thereon to obtain an ultra minimal roughness reflective surface, thereby to enhance reflective results.

50 Claims, 7 Drawing Sheets

ROUGHNESS REFLECTIVE LAYER FOR PIXEL DESIGNED THIN FILM TRANSISTOR AND LIQUID CRYSTAL DISPLAY

FIELD OF THE INVENTION

The present invention relates to a flat display, and more particularly, the present invention relates to a reflective-type or transflective-type liquid crystal display.

BACKGROUND OF THE INVENTION

Liquid crystal displays (LCD) are widely applied in electrical products, such as digital watches, calculators, and the like. Moreover, with the advance of techniques for manufacture and design, thin film transistor liquid crystal display (TFT-LCD) has been introduced into portable computers, personal digital assistants, and color televisions, and has gradually replaced the conventional cathode ray tube displays.

Transmission LCDs have been the main field of development. Generally, a light source, called a back light, of a transmission LCD is located behind the display. Hence, the material used for the pixel electrodes has to be a transparent conductive material such as indium tin oxide (ITO). The back light of a transmission LCD is the most power-consuming part. However, the widest application of LCDs is portable computers and communication products, for which batteries are the main power supply during use. Therefore, how to decrease the power consumption of an LCD is a main direction in LCD product development. Moreover, the reflection of the transmission LCD when used in a bright environment reduces the contrast to form a fuzzy image.

A reflective LCD is a solution to the problems mentioned above. The light source of a reflective LCD is located outside the LCD; therefore, a reflective layer is needed to reflect the light. Conventionally, pixel electrodes are used as the reflective layer. The material used for the pixel electrodes has to be a reflective conductive material such as metal aluminum. To achieve a better reflection, the surface of the pixel electrodes is uneven. However, there is still an unsolved problem for the reflective LCD. That is, when the intensity of light from the outside light source is not strong enough, the reflective LCD cannot display a clear image. Therefore, the transflective LCD has become the next target of research and development. The pixel electrodes of some transflective LCDs are aluminum plates having at least one opening filled with ITO. Therefore, when outside light intensity is not strong enough, the back light can be turned on to serve as a light source.

Typically, a scattered rough surface is formed to serve as the surface of the reflective layer. The height difference of the rough surface is about 0.5 to 1.5 $\mu$m. Such a height difference affects the arrangement of the liquid crystal molecule to reduce the image quality. FIG. 1 is a cross-sectional drawing of the conventional liquid crystal display. Referring to FIG. 1, the liquid crystal display comprises a top substrate 20 and a bottom substrate 10. A liquid crystal layer is disposed between the top substrate 20 and the bottom substrate 10. A reflective layer 12 made of resin is formed over the bottom substrate 10. The height difference existing in the surface of the rough layer 12 changes the cell gap. The cell gap in the protruding region 14 in the rough layer 12 is less than the concave region 16 in the rough layer 12. The reflective efficiency is related to the retardation (R) of the liquid crystal cell. The retardation (R) of the liquid crystal cell is related to the change value ($\Delta$d) of the cell gap and the birefringence ($\Delta$n) of the liquid crystal. Typically, the birefringence $\Delta$n of the liquid crystal is about 0.06 to 0.1. Therefore, the change value $\Delta$nd is 0.06 $\mu$m to 0.15 $\mu$m ($\Delta$nd$_j$ to $\Delta$nd$_i$) if the change value ($\Delta$d) of the cell gap is 0.5 $\mu$m to 1.5 $\mu$m.

The perfect change value $\Delta$nd of the retardation is less than 0.06 $\mu$m for the reflective twisted nematic mode (RTN mode) and mixed twisted nematic mode (mixed mode). Such change value $\Delta$nd reaches a reflective efficiency from 95% to 100% no matter what the value of the twisted angle is. However, the height difference existing in the conventional reflective layer enlarges the change value $\Delta$nd to reduce the reflective efficiency, from an ideal 100% to 60%. The low reflective efficiency cannot efficiently reflect ambient light to the user to make a clear image.

SUMMARY OF THE INVENTION

The main purpose of the present invention is to use an ultra minimal roughness reflective layer in a liquid crystal display. The ultra minimal roughness reflective layer formed over a substrate reduces the change value of the retardation to improve the reflective efficiency of the liquid crystal display to more than 95%.

Another purpose of the present invention is to provide an ultra minimal roughness reflective layer that can be formed on any metal layer for the liquid crystal display. In accordance with the present invention, the fabricating process of the ultra minimal roughness reflective layer is integrated into the fabricating process of the thin film transistor. Such integration not only optimizes the area of the ultra minimal roughness reflective layer but also reduces usage of photomasks to reduce the manufacturing cost.

A further purpose of the present invention is to provide an ultra minimal roughness reflective layer made from an inorganic material for the liquid crystal display. The reflective layer made of inorganic material can be used at a higher temperature than the reflective layer made of organic material. Therefore, the subsequent thermal process does not deform the reflective layer and affect the reflective efficiency.

Another purpose of the present invention is to provide an ultra minimal roughness reflective layer for the liquid crystal display. An amorphous indium tin oxide (ITO) layer and silicon-containing rough layer both form a rough bottom layer with a rough surface. Then, a reflective layer is conformed to the rough bottom layer with an ultra minimal rough surface. The reflective layer also has an ultra minimal rough surface. Therefore, the ultra minimal roughness reflective layer not only has an ultra minimal protruding-concave region but also improves the reflective angle of the reflective light.

The present invention is to provide an ultra minimal reflective layer structure. The ultra minimal reflective layer structure is formed over a substrate of a liquid crystal display to reflect ambient light. The structure comprises an amorphous or polycrystalline indium tin oxide layer, silicon-containing rough layer and a reflective layer. The amorphous indium tin oxide layer is formed over a substrate, and the silicon-containing rough layer is formed over the amorphous indium tin oxide layer. The silicon-containing rough layer has a rough surface. The height difference of the partial part of the rough layer is less than 100 nm. The reflective layer is formed over the rough layer and conformal to the rough layer. Therefore, the ultra minimal rough surface is also formed over the reflective layer.

On the other hand, the present invention provides a structure of a thin film transistor liquid crystal display unit. This structure is formed in a substrate; this structure comprises a pair of gate conductive lines and a pair of source conductive lines. Each pair conductive lines is parallel. This pair of gate conductive lines is perpendicular to the pair of source conductive lines. A display unit is formed between the two pairs of conductive lines. A transistor is formed in a corner of the display unit to connect with the adjacent gate conductive line and the source conductive line. An ultra minimal reflective layer is formed in the other region of the display unit to reflect ambient light. The ultra minimal reflective layer has an ultra minimal rough surface. The height difference of the partial region in the ultra minimal rough surface is less than 100 nm.

The ultra minimal reflective layer of the present invention has an ultra minimal rough surface. The height difference of the partial region in the ultra minimal rough surface is less than 100 nm, much smaller than the height difference of the conventional reflective layer. Such an ultra minimal roughness reflective layer efficiently reduces the change value of the retardation to improve the reflective efficiency of the liquid crystal display to more than 95%. Moreover, the smaller grain of the rough surface improves the angle of the reflective light to enlarge the viewing angle. The reflective layer made of inorganic material can be used at a higher temperature than the reflective layer made of organic material. Therefore, the subsequent thermal process does not deform the reflective layer and affect the reflective efficiency.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides a liquid crystal display with an ultra minimal reflective layer. An ultra minimal reflective layer comprises an amorphous indium tin oxide (a-ITO) layer and a silicon-containing rough layer. An ultra minimal rough surface is formed over the rough layer. Then, a reflective layer made of inorganic material is formed over the rough layer, wherein the reflective layer is conformed to the rough layer. The reflective layer also has an ultra minimal rough surface. The reflective layer made of inorganic material can be used at a higher temperature than the reflective layer made of organic material. On the other hand, the reflective layer with the minimal rough surface not only has the original reflective characteristic but also reduces the change value of the cell gap to improve the reflective efficiency of the liquid crystal display to more than 95%. In particular, the manufacturing process of the reflective layer with the minimal rough surface is integrated into the conventional manufacturing process of the thin film transistor, which reduces the use of photomasks during the manufacturing process. Therefore, this present invention reduces manufacturing costs.

The reflective layer with the minimal rough surface of the present invention is used in liquid crystal displays, and is especially used in the reflective-type or transflective-type liquid crystal display. Without limiting the spirit and scope of the present invention, the structure proposed in the present invention is illustrated with one preferred embodiment. Skilled artisans, upon acknowledging the embodiments, can apply the present invention to any kind of liquid crystal display. The usage of the present invention is not limited by the embodiment as follows.

Figure 1:
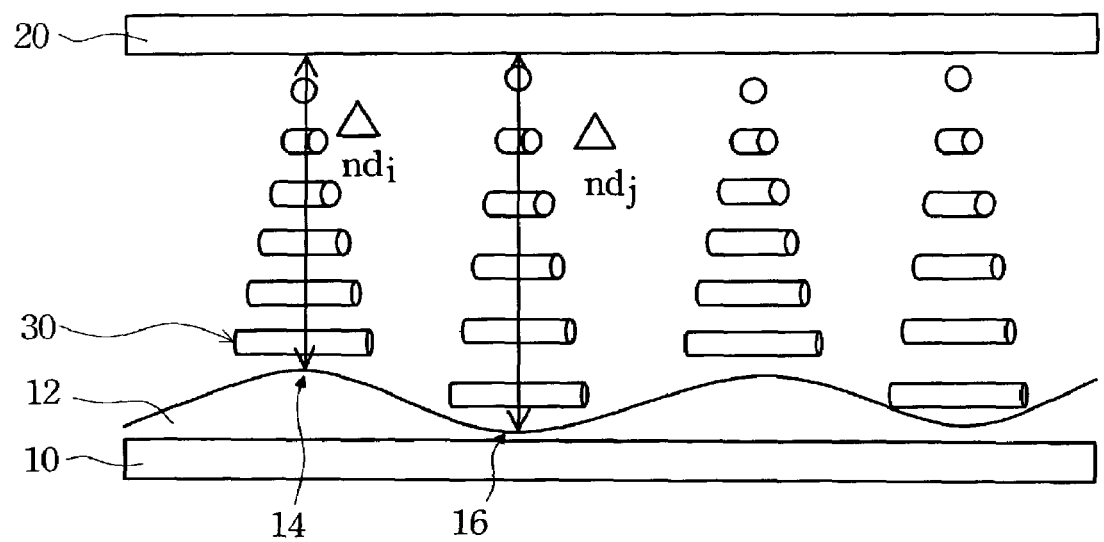
FIG. 1 is a schematic, cross-sectional drawing of a conventional liquid crystal display unit with a rough surface having a huge height difference is formed over the glass substrate and the huge height difference reduces the reflective efficiency.
Figure 2A:
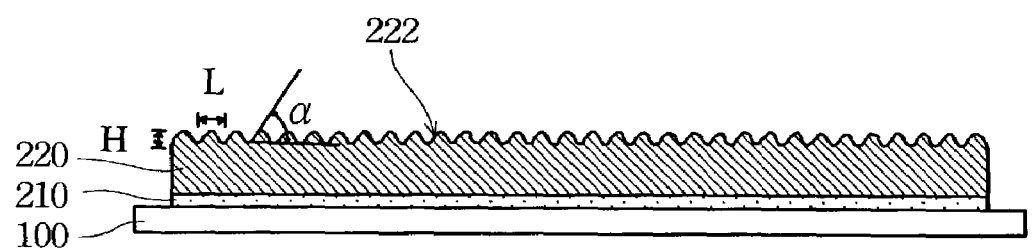
FIGS. 2A to 2B are schematic, cross-sectional drawings of an ultra minimal reflective layer in accordance with the preferred embodiment.
Figure 2B:
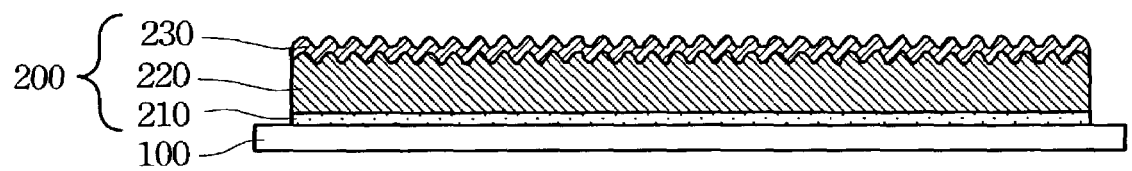

The fabricating process of the reflective layer with the minimal rough surface is described herein. FIGS. 2A to 2B are schematic, cross-sectional drawings of an ultra minimal reflective layer in accordance with the preferred embodiment. Referring to FIG. 2A, a substrate 100 is provided. The substrate 100 is a glass substrate used in a liquid crystal display.

First, an amorphous indium tin oxide layer 210 (a-ITO) is formed over the substrate 100. A polycrystalline indium tin oxide layer also can be used. The amorphous indium tin oxide layer is formed by a CVD process, such as plasma enhanced CVD, using indium oxide and stannic oxide. The indium tin oxide layer is controlled to form an amorphous crystal structure by the conditions control during the process.

Next, a silicon-containing rough layer 220 is formed over the a-ITO layer 210. The material of the silicon-containing rough layer 220 is amorphous silicon, polysilicon, silicon nitride ($SiN_x$), silicon oxide ($SiO_x$) or silicon oxynitrides ($SiON_x$). Typically, the silicon-containing rough layer 220 is formed by CVD. The crystal structure of the a-ITO layer 210 is extended to the silicon-containing rough layer 220 and results in the silicon-containing rough layer 220 with the ultra minimal rough surface 222. It is very important to control the level of the roughness of the ultra minimal rough surface 222 while forming the silicon-containing rough layer 220. The size of the protruding grain in the ultra minimal rough surface 222 of the silicon-containing rough layer 220 is controlled by changing the process conditions. As shown in the FIG. 2A, the average length L of the protruding grain is about 10 nm to 800 nm, and the height H is about 5 nm to 100 nm. The sharp angle ($\alpha$) of the protruding grain is controlled to within about 1 to 60 degrees.

Referring to FIG. 2B, a reflective layer 230 is formed over the silicon-containing rough layer 220. The a-ITO layer 210, silicon-containing rough layer 220 and the reflective layer 230 comprise the ultra minimal reflective layer 200. The reflective layer 230 is formed from a material with an excellent reflective characteristic. Typically, the reflective layer 230 is formed of a metal material such as aluminum (Al), silver (Ag) or a combination thereof. The reflective layer 230 is conformal to the silicon-containing rough layer 220. Therefore, an ultra minimal rough surface the same as the surface of the silicon-containing rough layer 220 is formed on the reflective layer 230. The sharp angle of the protruding grain on the ultra minimal rough surface of the reflective layer 230 is controlled to be about 1 to 60 degrees and the preferred sharp angle is about 3 to 20 degrees. An excellent reflective efficiency is obtained in the range of the sharp angle.

Figure 3:
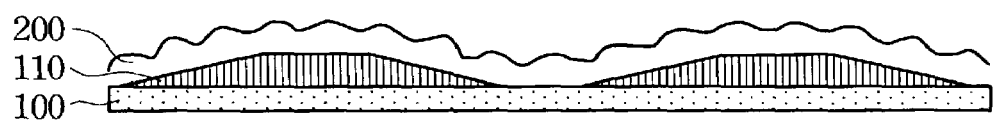
FIG. 3 is a schematic, cross-sectional drawing of an ultra minimal reflective layer in accordance with another preferred embodiment.

A bump layer 110 is formed between the substrate 100 and the ultra minimal reflective layer 200 as shown in the FIG. 3. The bump layer 110 is a metal material, such as aluminum (Al), chromium (Cr), MoCr or the like. On the other hand, an inorganic material, such as silicon nitride or silicon oxide, and an organic material, such as resin and photoresist, also can be used to form the bump layer. For example, if the material of the bump layer 110 is MoCr, an aluminum layer is first formed over the MoCr layer. Then, a photoresist layer with bumps is formed over the aluminum layer. A wet etching is used to etch the interface between the photoresist and the MoCr layer to form a tapered metal bump. The height difference of the bump layer 110 is controlled to about 30 to 1600 nm. The tilt angle is controlled to about 2 to 75 degrees. The bump layer 110 controls the reflective efficiency in a specific direction. Moreover, the bump layer 110 has a big scatter angle. Therefore, the bump layer 110 smooths the reflective efficiency to avoid violent change of the reflective efficiency according to the viewing angle. Therefore, the bump-layer 110 has an anti-glare function.

The bump layer 110 can also be formed of a resin. Then, the ultra minimal reflective layer 200 is formed over the bump layer 110. Using the resin material to form the bump layer 110 also obtains an anti-glare function. The bump layer 110 and the ultra minimal reflective layer 200 both are made of a material that resists high temperatures. A process with a temperature of about 400 to 500 degrees can be performed on the bump layer 110 and the ultra minimal reflective layer 200. This kind of high temperature process does not deform the bump layer 110 and the ultra minimal reflective layer 200. Therefore, the present invention provides a stable structure that avoids the influence of subsequent processes.

There are at least two design types for the bump layer 110. In the first design, the transmitting region distributes the greater part of the bump layer 110. Then, the reflective region is patterned in the transmitting region. The pattern of the reflective region is a scattered distributed round pattern. Next, the technology described in the foregoing paragraphs is used to form the bump layer 110 and the ultra minimal reflective layer 200. The reflective region is formed according to the scattered round pattern. In the second design, the reflective region distributes the greater part of the bump layer 110. Then, the transmitting region is patterned in the reflective region. The pattern of the transmitting region is a scattered distributed round pattern. However, other patterns, such as a scattered distributed rectangular pattern, a scattered distributed ellipsoidal pattern or the like, can also be used to form the transmitting region pattern. Next, the technology described in the foregoing paragraphs is used to form the bump layer 110 and the ultra minimal reflective layer 200. The reflective region is formed according to the scattered round pattern.

Figure 4:
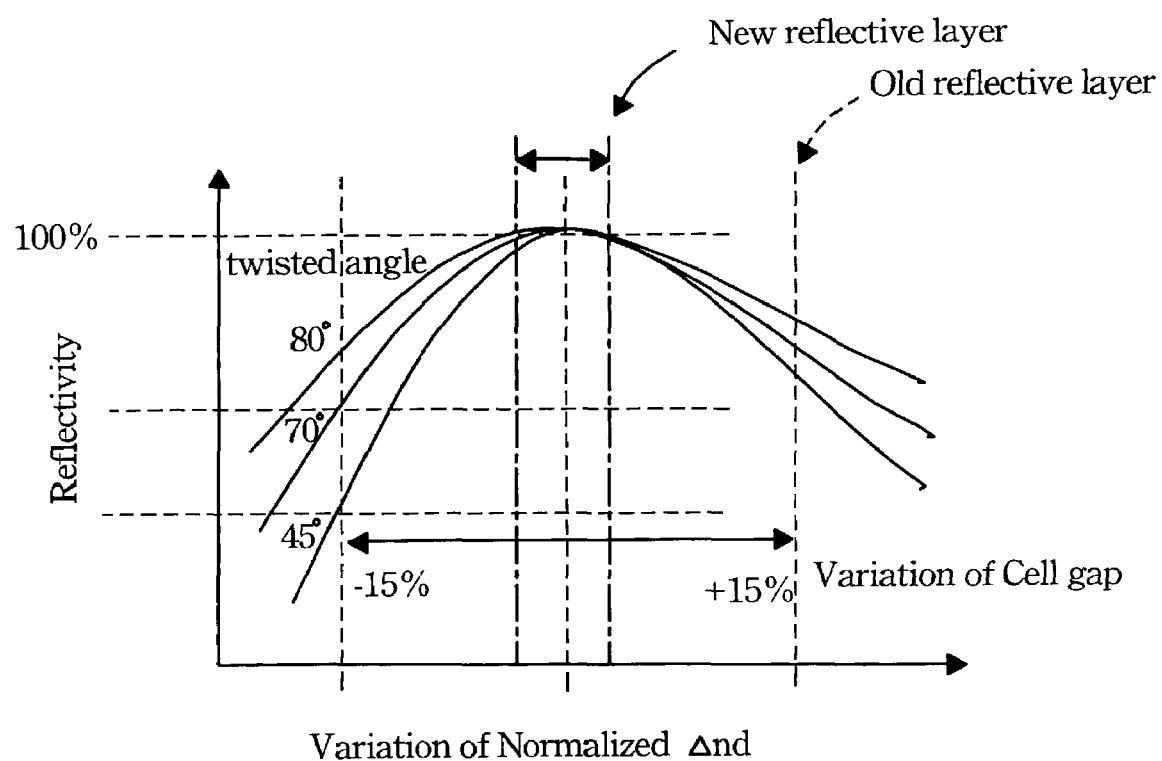
FIG. 4 is a drawing comparing the reflective efficiency and the change value Δnd of the retardation for the reflective layer of the present invention and the prior art.

FIG. 4 is a drawing comparing the reflective efficiency and the change value $\Delta nd$ of the retardation for the reflective layer of the present invention and the prior art. The reflective layer of the prior art has a violent change value of the cell gap. The violent change value of the cell gap reduces the reflective efficiency. Moreover, the smaller twisted angle of the liquid crystal molecule causes the lower reflective efficiency. However, the ultra minimal reflective layer of the present invention smooths the violent change of the cell gap. Therefore, the liquid crystal display maintains high reflective efficiency, above about 95%, no matter how large the twisted angle of the liquid crystal molecule is. The liquid crystal molecule used in the structure of the present invention is a positive liquid crystal molecule. Typically, the birefringence $\Delta n$ of the liquid crystal is about 0.055 to 0.12. The retardation (R) $\Delta n \times d_T$ is about 260 nm to 450 nm, and the retardation (R) $\Delta n \times d_R$ is about 205 nm to 345 nm. On the other hand, the liquid crystal molecule used in the structure of the present invention also can be a negative liquid crystal molecule. Typically, the birefringence $\Delta n$ of the liquid crystal is about 0.055 to 0.135. The retardation (R) $\Delta n \times d_T$ is about 325 nm to 510 nm, and the retardation (R) $\Delta n \times d_R$ is about 150 nm to 410 nm.

The ultra minimal reflective layer of the present invention can be used in any type of thin film transistor and the manufacturing process of the ultra minimal reflective layer can also be integrated into the manufacturing process of the thin film transistor. A manufacturing process of an amorphous silicon thin film transistor is described in the following to describe this present invention. The manufacturing process of the ultra minimal reflective layer of the present invention can also be integrated into the manufacturing process of other devices, such as the polysilicon thin film transistor, with structures similar to that of the thin film transistor. On the other hand, there are many different structure types of the amorphous silicon thin film transistor. For example, the storage capacitor can be built on the common electrode position or built on the gate electrode position. The following described technology is related to an amorphous silicon thin film transistor whose storage capacitor is built on the common electrode position. However, similar technology can also be applied to an amorphous silicon thin film transistor whose storage capacitor is built on the gate electrode position. Similarly, although the following described technology is applied in a N-type thin film transistor, the technology can also be applied to a P-type thin film transistor or a complementary-type thin film transistor.

The ultra minimal reflective layer with high reflective efficiency can be disposed between any two layers to form a common layer with the metal conductive layer. The following embodiments describe the present invention.

Figure 5A:
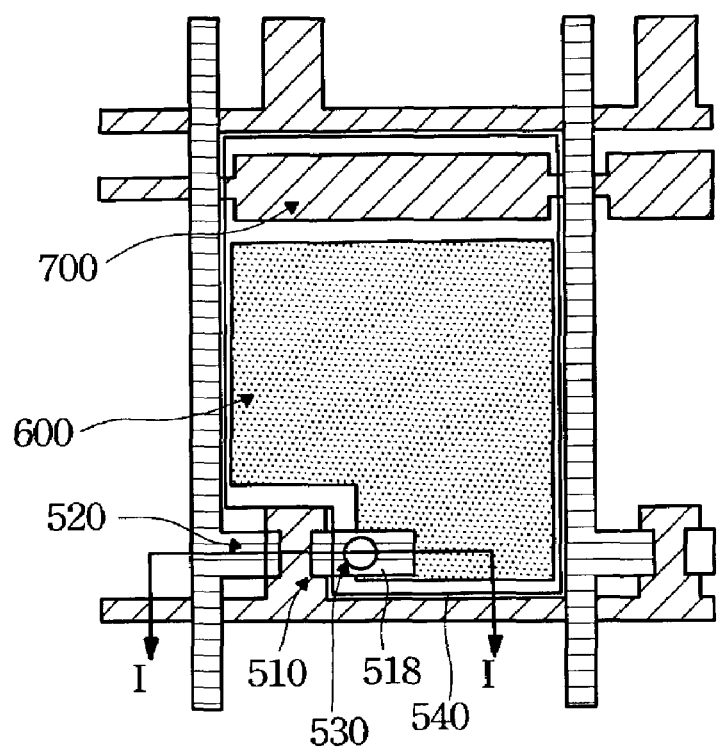
FIG. 5A is a schematic, top view of an ultra minimal reflective layer and the first metal layer in accordance with the present invention.
Figure 5B:
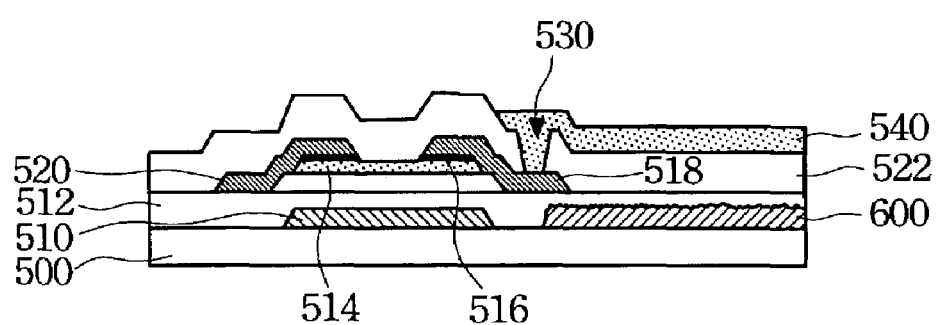
FIG. 5B is a schematic, cross-sectional drawing of an ultra minimal reflective layer and the first metal layer in accordance with the present invention.

First Embodiment:

First, the ultra minimal reflective layer is formed on the bottom layer to form a common layer with the first metal conductive line layer in accordance with the first embodiment. FIG. 5A is a schematic, top view of an ultra minimal reflective layer and the first conductive line layer in accordance with the first embodiment of the present invention. FIG. 5B is a schematic, cross-sectional drawing from the I—I line of the FIG. 5A of an ultra minimal reflective layer and the first metal conductive line layer in accordance with the first embodiment of the present invention. Referring to FIG. 5A and FIG. 5B, a gate electrode 510 and a gate conductive line 510a connected with the gate electrode 510 are first formed over the substrate 500 when fabricating a thin film transistor. A storage capacitor 700 is formed in this position corresponding to the gate electrode 510 while fabricating the gate electrode 510. An ultra minimal reflective layer 600 is disposed between the storage capacitor 700 and the gate conductive line 510a. The fabricating process of the ultra minimal reflective layer 600 is similar to the foregoing description. When fabricating the ultra minimal reflective layer 600, a specific gap between the storage capacitor 700 and the gate conductive line 510a has to exist to avoid generating a coupled capacitor. A first dielectric layer 512 is formed over the whole substrate 500 after finishing the above process. This first dielectric layer 512 is integrated into the rough layer (silicon-containing rough layer 220) of the ultra minimal reflective layer 600. Such integration eliminates a photomask process step.

Next, steps of forming source electrode and drain electrode are performed. An amorphous silicon layer 514 is formed in the position corresponding to the gate electrode 510. Then, two doped polysilicon layers 516 are symmetrically formed around the amorphous silicon layer 514. The fabricating of the second metal conductive line is the next process step. First, metal layers are respectively formed over the two doped polysilicon layers 516 to serve as the drain electrode 518, the source electrode 520 and the vertical conductive line connected with the source electrode 520. A second dielectric layer 522 with a contact window 530 is formed over the drain electrode 518, the source electrode 520, the amorphous silicon layer 514 and the first dielectric layer 512. Finally, a transparent electrode 540 is formed in the region without the transistor. The transparent electrode 540 can be made of indium tin oxide (ITO) material. The transparent electrode 540 is connected with the drain electrode 518 through the contact window 530. In accordance with a display unit with a size 700×210 μm, the aperture ratio of the ultra minimal reflective layer 600 to the display unit is about 75% because of the storage capacitor 700. The aperture ratio of the ultra minimal reflective layer 600 to the display unit can be raised to about 80% if the storage capacitor 700 is built on a position near the gate electrode. A bump layer also can be formed under the ultra minimal reflective layer to improve the anti-glare function.

Figure 6A:
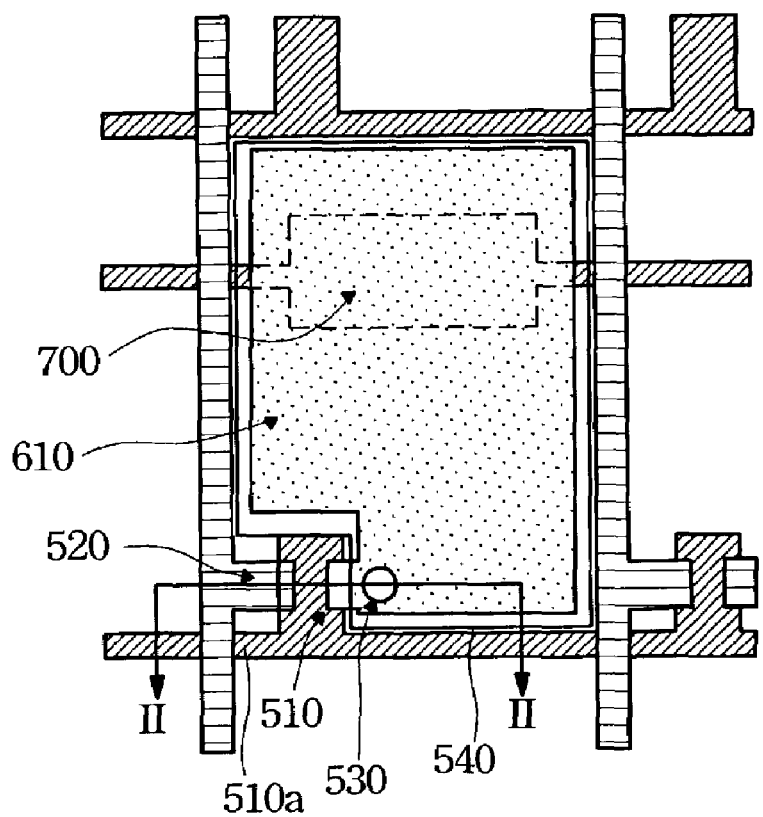
FIG. 6A is a schematic, top view of an ultra minimal reflective layer and the second metal layer in accordance with the present invention.
Figure 6B:
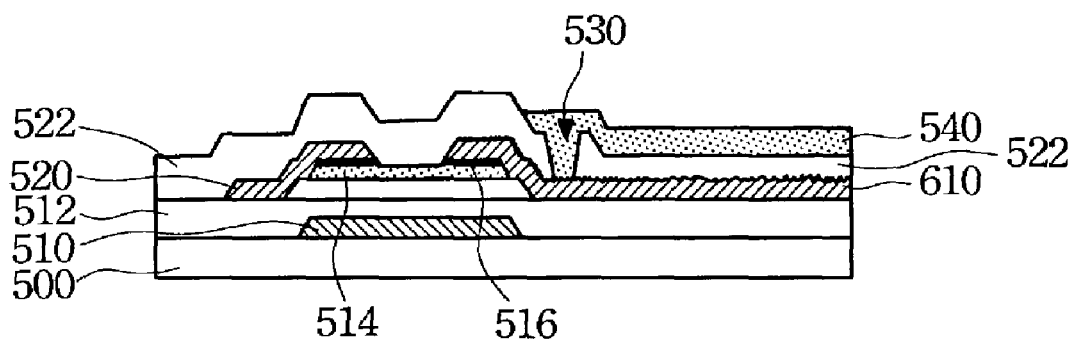
FIG. 6B is a schematic, cross-sectional drawing of an ultra minimal reflective layer and the second metal layer in accordance with the present invention.

Second Embodiment:

The ultra minimal reflective layer of the present invention, in addition to being formed in the bottom layer, can also be formed in the second layer to form a common layer with the conductive line located in the second layer. FIG. 6A is a schematic, top view of an ultra minimal reflective layer and the second metal conductive line layer in accordance with the second embodiment of the present invention. FIG. 6B is a schematic, cross-sectional drawing along the II—II line of FIG. 6A of an ultra minimal reflective layer and the second metal conductive line layer in accordance with the second embodiment of the present invention. Referring to FIG. 6A and FIG. 6B, a gate electrode 510 and a gate conductive line 510a connected with the gate electrode 510 is first formed over the substrate 500 when fabricating a thin film transistor. A storage capacitor 700 is formed in this position corresponding to the gate electrode 510 while fabricating the gate electrode 510. A first dielectric layer 512 is formed over the whole substrate 500. This first dielectric layer 512 is integrated into the rough layer (silicon-containing rough layer 220) of the ultra minimal reflective layer 610. Such integration eliminates a photomask process step.

Next, steps of forming a source electrode and drain electrode are performed. An amorphous silicon layer 514 is formed in the gate electrode 510. Then, two doped polysilicon layers 516, such as an N-type doped polysilicon layer, are symmetrically formed around the amorphous silicon layer 514. Fabrication of the second metal conductive line is the next step in the process. First, metal layers are respectively formed over the two doped polysilicon layers 516 to serve as the drain electrode 518 (as shown in FIG. 5A), the source electrode 520 and the vertical conductive line connected with the source electrode 520. Finally, an ultra minimal reflective layer 610 is formed in a display unit that is formed between the two gate conductive lines 510a and the conductive line connected with the source electrode 520. The fabrication method is similar to the fabrication method of the ultra minimal reflective layer 200 described in the foregoing paragraphs. The drain electrode 518 combines directly with the ultra minimal reflective layer 610 to improve the reflective area as shown in FIG. 6A. However, the isolated design has the preferred electrical characteristic.

Next, a second dielectric layer 522 with a contact window 530 is formed over the drain electrode 518, the source electrode 520, the amorphous silicon layer 514 and the ultra minimal reflective layer 610. Finally, a transparent electrode 540 is formed in the region without the transistor. The transparent electrode 540 is made of indium tin oxide (ITO) material. The transparent electrode 540 is connected with the drain electrode 518 through the contact window 530. The ultra minimal reflective layer 610 is located in the second conductive line layer; therefore, it is not affected by the storage capacitor. However, a gap with the vertical conductive line connected with the source electrode still has to exist to avoid generating a coupled capacitor. In accordance with a display unit with a size 700×210 μm, the aperture ratio of the ultra minimal reflective layer 610 to the display unit is about 80% because of the gaps. A bump layer also can be formed under the ultra minimal reflective layer to improve the anti-glare function.

Figure 7A:
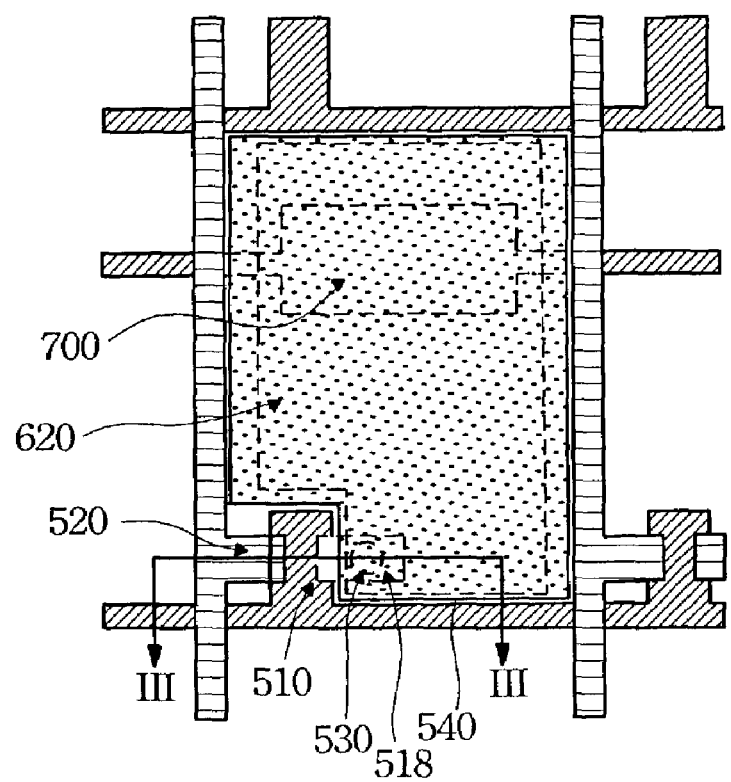
FIG. 7A is a schematic, top view of an ultra minimal reflective layer and the third metal layer in accordance with the present invention.
Figure 7B:
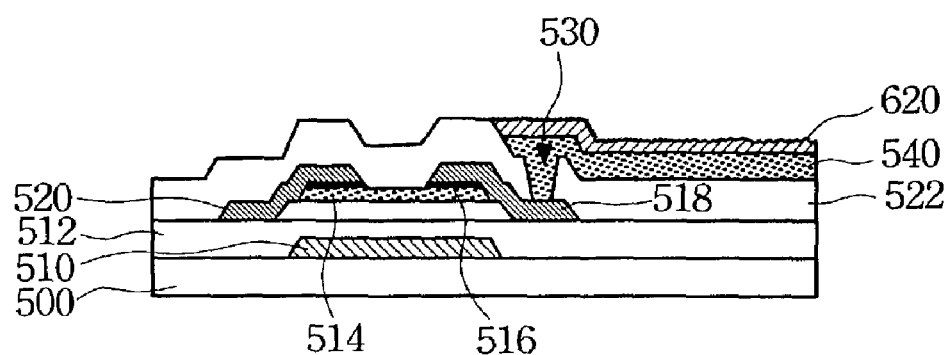
FIG. 7B is a schematic, cross-sectional drawing of an ultra minimal reflective layer and the third metal layer in accordance with the present invention.

Third Embodiment:

The ultra minimal reflective layer can also be formed in the third layer to form a common layer with the transparent electrode in accordance with the third embodiment. FIG. 7A is a schematic, top view of an ultra minimal reflective layer and the third conductive line layer in accordance with the third embodiment of the present invention. FIG. 7B is a schematic, cross-sectional drawing along the III—III line of the FIG. 7A of an ultra minimal reflective layer and the third metal conductive line layer in accordance with the third embodiment of the present invention. Referring to FIG. 7A and FIG. 7B, a gate electrode 510 and a gate conductive line 510a connected with the gate electrode 510 are first formed over the substrate 500 when fabricating a thin film transistor. A storage capacitor 700 is formed in this position corresponding to the gate electrode 510 while fabricating the gate electrode 510. A first dielectric layer 512 is formed over the whole substrate 500 after finishing the above process.

Next, the source electrode and drain electrode are formed. An amorphous silicon layer 514 is formed in the position corresponding to the gate electrode 510. Then, two doped polysilicon layers 516, such as an N-type doped polysilicon layer, are symmetrically formed around the amorphous silicon layer 514. The second metal conductive line is next fabricated. First, metal layers are respectively formed over the two doped polysilicon layers 516 to serve as the drain electrode 518, the source electrode 520 and the vertical conductive line connected with the source electrode 520. A second dielectric layer 522 with a contact window 530 is formed over the drain electrode 518, the source electrode 520, the amorphous silicon layer 514 and the first dielectric layer 512. Finally, a transparent electrode 540 is formed in the region without the transistor. The transparent electrode 540 is made of indium tin oxide (ITO) material. The transparent electrode 540 is connected with the drain electrode 518 through the contact window 530. Finally, an ultra minimal reflective layer 620 is formed in a display unit that is formed between the two gate conductive lines 510a and the conductive line connected with the source electrode 520. The fabrication method is similar to the fabrication method of the ultra minimal reflective layer 200 described in the foregoing paragraphs.

The bottom layer of the ultra minimal reflective layer 620 can be combined with the transparent electrode 540 to form the a-ITO layer. Such a fabrication method eliminates the process steps of the transparent electrode 540. However, the metal reflective layer (corresponding to the reflective layer 230) has to connect with the drain electrode 518 to serve as a display electrode. Moreover, the dielectric layer 522 can be eliminated and the rough layer (silicon-containing rough layer 220) of the ultra minimal reflective layer 620 can be used to replace the dielectric layer 522. Such a structure reduces the photomask process. The ultra minimal reflective layer 620 is located in the top conductive line layer; therefore, it is not affected by the first conductive line layer and the second conductive layer. The ultra minimal reflective layer 620 occupies the maximum area in accordance with this structure.

In accordance with a display unit with a size 700×210 μm, the aperture ratio of the ultra minimal reflective layer 620 to the display unit is about 88% because the boundary of the ultra minimal reflective layer 620 is aligned with the conductive line around the reflective layer 620. A preferred process integration can be reached if the ultra minimal reflective layer 620 is formed in the third conductive line layer because the interference coming from the peripheral conductive device is reduced. Moreover, the top layer can be used to replace the conventional ITO layer as the opening electrode if the top layer of the ultra minimal reflective layer 620 is made of conductive material.

Figure 8A:
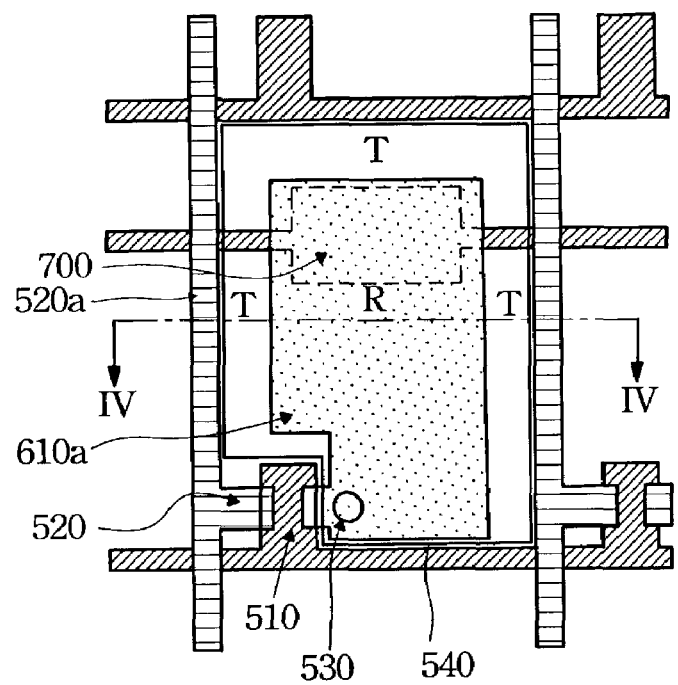
FIG. 8A is a schematic, top view of an ultra minimal reflective layer formed in a transflective liquid crystal display in accordance with the present invention.
Figure 8B:
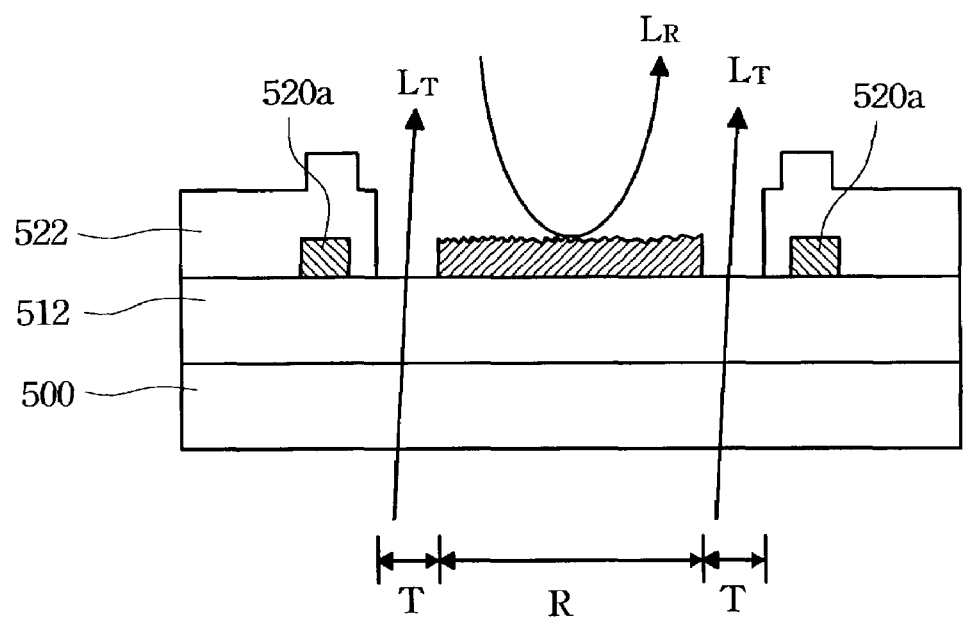
FIG. 8B is a schematic, cross-sectional drawing of an ultra minimal reflective layer formed in a transflective liquid crystal display in accordance with the present invention.

Fourth Embodiment:

The above three embodiments are related to the reflective-type liquid crystal display. The ultra minimal reflective layer can also be used in a transflective-type liquid crystal display. In the fourth embodiment, the ultra minimal reflective layer of the present invention is used in a transflective-type liquid crystal display and formed in the second layer to form a common layer with the conductive line located in the second layer. FIG. 8A is a schematic, top view of an ultra minimal reflective layer used in a transflective liquid crystal display in accordance with the fourth embodiment of the present invention. FIG. 8B is a schematic, cross-sectional drawing along the IV—IV line of FIG. 8A. Referring to FIG. 8A and FIG. 8B, in a process similar to that of the second embodiment, a gate electrode 510 and a gate conductive line 510a connected with the gate electrode 510 are first formed over the substrate 500 when fabricating a thin film transistor. A storage capacitor 700 is formed in this position corresponding to the gate electrode 510 while fabricating the gate electrode 510. A first dielectric layer 512 is formed over the whole substrate 500.

Next, the source electrode and drain electrode are formed. An amorphous silicon layer and a doped polysilicon layer are sequentially formed over the first dielectric layer 512. The second metal conductive line is next formed. First, metal layers are respectively formed over the doped polysilicon layer 516 to serve as the drain electrode 518 (as shown in FIG. 5A), the source electrode 520 and the vertical conductive line 520a connected with the source electrode 520. Finally, an ultra minimal reflective layer 610a is formed in a display unit that is formed between the two gate conductive lines 510a and the conductive line 520a connected with the source electrode. The fabrication method is similar to the fabrication method of the ultra minimal reflective layer 200 described in the foregoing paragraphs. The drain electrode 518 can be combined directly with the ultra minimal reflective layer 610a to improve the reflective area as shown in FIG. 8A.

In accordance with the design, a specific distance exists between the ultra minimal reflective layer 610a and the gate conductive line 510a. Another specific distance exists between the ultra minimal reflective layer 610a and the vertical source electrode conductive line 520a. The reflective region R (the ultra minimal reflective layer) is located in the middle and is surrounded by the transmitting region T. Ambient light is reflected by the ultra minimal reflective layer 610 to form the reflective light $L_R$. The back light passes through the transmitting region T to form the transmitting light $L_T$. The ratio of the transmitting light $L_T$ to the reflective light $L_R$ can be modified in accordance with the operation of switching the light source. Moreover, the ratio of the transmitting region to the reflective region can be modified by controlling the area of the ultra minimal reflective layer 610a.

As described above, the transmitting pattern can be designed in the ultra minimal reflective layer 610a to form the transmitting region. The transmitting pattern is a scattered distributed round pattern, a scattered distributed rectangle pattern, a scattered distributed ellipse pattern or the like. The transmitting region and the reflective region respectively have a first area and a second area. The ratio of the first area to the second area is about 10% to 420%. The transmitting efficiency can be modified by controlling the ratio of the first area to the second area.

The electrode opening formed in the top electrode and the bottom electrode of the pixel region collocate the negative liquid crystal and the vertical alignment type to form the electrical field effect to provide a multi-domain structure.

The structures described in the above do not form the cover layer on the thin film transistor. Therefore, a black matrix can be used as the cover layer to avoid unnecessary transmitting light.

In accordance with the preferred embodiments described in the above, the ultra minimal reflective layer can be used in the reflective-type or the transflective-type liquid crystal display, such as TFT-LCD, a-Si TFT-LCD, poly-Si TFT-LCD, STN-LCD, TFD-LCD and on the like. This ultra minimal reflective layer improves the reflective efficiency. Moreover, the reflective layer with the ultra minimal grain reduces the height difference of the surface to avoid violent change of the cell gap and thus improve the reflective efficiency. On the other hand, the reflective layer made of inorganic material can be used at a higher temperature than the reflective layer made of organic material. Therefore, the subsequent thermal process does not deform the reflective layer or affect the reflective efficiency. A bump layer also can be used in the structure. The bump layer has a big scatter angle. Therefore, the bump layer smooths the reflective efficiency to avoid the violent change of the reflective efficiency according to the viewing angle to improve the antiglare function.

As is understood by a person skilled in the art, the foregoing descriptions of the preferred embodiment of the present invention are an illustration of the present invention rather than a limitation thereon. It is intended to cover various modifications and similar arrangements included within the spirit and scope of the appended claims. The scope of the claims should be accorded to the broadest interpretation so as to encompass all such modifications and similar structures. While the preferred embodiment of the invention has been illustrated and described, it will be appreciated that various changes can be made therein without departing from the spirit and scope of the invention.

What is claimed is:

1. A reflective layer structure formed in a pixel unit of a liquid crystal display for reflecting ambient light, said liquid crystal display having a first substrate, a second substrate, and a liquid crystal layer formed between said first substrate and said second substrate, said pixel unit having a transmitting region and a reflecting region, said structure comprising:
   a bump layer located over said first substrate;
   an amorphous indium tin oxide located over said bump layer;
   a silicon-containing rough layer located over said amorphous indium tin oxide and said silicon-containing rough layer with a rough surface, wherein a height difference of a region of said rough surface is less than about 100 nm; and
   a reflective layer located over said silicon-containing rough layer and conformal to said silicon-containing rough layer to allow said reflective layer to have a surface similar to said rough surface;
   wherein a bump layer surface has a height difference of about 30 to 1600 nm.

2. The reflective layer structure as claimed in claim 1, wherein said structure is used in TFT-LCD, a-Si TFT-LCD, poly-Si TFT-LCD, STN-LCD or TFD-LCD to serve as a reflective layer.

3. The reflective layer structure as claimed in claim 1, wherein a material of said silicon-containing rough layer is selected from a group consisting of silicon nitrides, silicon oxides and silicon oxynitrides.

4. The reflective layer structure as claimed in claim 1, wherein said rough surface includes a plurality of protruding regions.

5. The reflective layer structure as claimed in claim 4, wherein a sharp angle of said rough surface is about 1 to 60 degrees.

6. The reflective layer structure as claimed in claim 1, wherein a material of said reflective layer comprises a metal with one of a high reflective efficiency and multi-layers.

7. The reflective layer structure as claimed in claim 1, wherein a material or said reflective layer is selected from a group consisting of aluminum (Al), silver (Ag) and a combination thereof.

8. The reflective layer structure as claimed in claim 1, wherein a sharp angle of said bump layer surface is about 2 to 75 degrees.

9. The reflective layer structure as claimed in claim 1, wherein a material of said bump layer is one of a metal material, inorganic material and organic material.

10. The reflective layer structure as claimed in claim 1, wherein a material of said bump layer is one of aluminum (Al), chromium (Cr), MoCr, silicon nitride and silicon oxide.

11. The reflective layer structure as claimed in claim 1, wherein a material of said bump layer is one of resin and organic photoresist.

12. The reflective layer structure as claimed in claim 1, wherein said liquid crystal is a positive-type liquid crystal with a birefringence $\Delta n$ of about 0.055 to 0.12, a retardation (R) $\Delta n \times d_T$ of about 260 nm to 450 nm, and a retardation (R) $\Delta n \times d_R$ of about 205 nm to 345 nm.

13. The reflective layer structure as claimed in claim 1, wherein said liquid crystal is a negative-type liquid crystal with a birefringence $\Delta n$ of about 0.055 to 0.135, a retardation (R) $\Delta n \times d_T$ of about 325 nm to 510 nm, and a retardation (R) $\Delta n \times d_R$ of about 150 nm to 410 nm.

14. The reflective layer structure as claimed in claim 1, wherein said transmitting region has a first distance between the cells and said reflective region has a second distance between the cells, and the distance between said first distance and said second distance is less than 0.6 $\mu m$.

15. The reflective layer stature as claimed in claim 1, wherein said transmitting region has a first area, said reflective region has a second area and a ratio of said first area to said second area is about 10% to 420%.

16. The reflective layer structure as claimed in claim 1, wherein a pattern of said transmitting region is one of a round pattern, a rectangular pattern and an ellipsoidal pattern.

17. A method for fanning a reflective layer, wherein said reflective layer is formed in a pixel unit of a liquid crystal display for reflecting ambient light, said liquid crystal display having a first substrate, a second substrate, and a liquid crystal layer famed between said first substrate and said second substrate, said pixel unit having a transmitting region and a reflecting region, said method comprising:
   forming a bump layer over said first substrate;
   forming an amorphous indium tin oxide over said bump layer;
   forming a silicon-containing rough layer over said amorphous indium tin oxide and said silicon-containing rough layer with an rough surface, wherein a height difference of a region of said rough surface is less than about 100 nm; and
   forming a reflective layer over said silicon-containing rough layer, wherein said reflective layer is conformal to said silicon-containing rough layer to allow said reflective layer to have a surface similar to said rough surface;
   wherein a bump layer surface has a height difference of about 30 to 1600 nm.

18. The method as claimed in claim 17, wherein said amorphous indium tin oxide is formed by CVD.

19. The method as claimed in claim 17, wherein said amorphous indium tin oxide is formed by PECVD.

20. The method as claimed in claim 17, wherein a material of said silicon-containing rough layer is selected from a group consisting of silicon nitrides, silicon oxides and silicon oxynitrides.

21. The method as claimed in claim 17, wherein a sharp angle of said rough surface is about 1 to 60 degrees.

22. The method as claimed in claim 17, wherein a material of said reflective layer comprises a metal with one of high reflective efficiency and multi-layers.

23. The method as claimed in claim 17, wherein a material of said reflective layer is selected from a group consisting of aluminum (Al), silver (Ag), and a combination thereof.

24. The method as claimed in claim 17, wherein a sharp angle of said bump layer surface is about 2 to 75 degrees.

25. The method as claimed in claim 17, wherein a material of said bump layer is one of metal material, inorganic material and organic material.

26. The method as claimed in claim 17, wherein a material of said bump layer is one of aluminum (Al), chromium (Cr), MoCr, silicon nitride and silicon oxide.

27. The method as claimed in claim 17, wherein a material of said bump layer is one of resin and organic photoresist.

28. The method as claimed in claim 17, wherein said liquid crystal is a positive-type liquid crystal with a birefringence $\Delta n$ of about 0.055 to 0.12, a retardation (R) $\Delta n \times d_T$ of about 260 nm to 450 nm, and a retardation (R) $\Delta n \times d_R$ of about 205 nm to 345 nm.

29. The method as claimed in claim 17, wherein said liquid crystal is a negative-type liquid crystal with a birefringence $\Delta n$ of about 0.055 to 0.135, a retardation (R) $\Delta n \times d_T$ of about 325 nm to 510 nm, and a retardation (R) $\Delta n \times d_R$ of about 150 nm to 410 nm.

30. The method as claimed in claim 17, wherein said transmitting region has a first distance between the cells and said reflective region has a second distance between the cells, and the distance between said first distance and said second distance is less than 0.6 $\mu$m.

31. The method as claimed in claim 17, wherein said transmitting region has a first area, said reflective region has a second area, and a ratio of said first area to said second area is about 10% to 420%.

32. The method as claimed in claim 17, wherein a pattern of said transmitting region is one of a round pattern, a rectangular pattern and an ellipsoidal pattern.

33. A pixel unit structure of a liquid crystal display, wherein said liquid crystal display has a first substrate, a second substrate, and a liquid crystal layer formed between said first substrate and said second substrate, said pixel unit being located over said first substrate, said pixel unit comprising:
   a pair of gate electrode conductive lines, wherein said pair of gate electrode conductive lines are parallel to each other;
   a pair of source electrode conductive lines, wherein said source electrode conductive lines are parallel to each other and perpendicular to said pair of gate electrode conductive lines, and wherein a display unit is formed between said pair of gate electrode conductive lines and said pair of source electrode conductive lines:
   a transistor located in a corner of said display unit and connected with an adjacent said gate electrode conductive line and an adjacent said source electrode conductive line; and
   a reflective layer located in said display unit for reflecting ambient light, wherein said reflective layer comprises a bump layer, an amorphous indium tin oxide layer located over said bump layer, and a silicon-containing rough layer located over said amorphous indium tin oxide and said silicon-containing rough layer with a rough surface;
   wherein a bump layer surface has a height difference of about 30 to 1600 nm.

34. The pixel unit structure as claimed in claim 33, wherein a material of said silicon-containing rough layer is selected from a group consisting of silicon nitrides, silicon oxides and silicon oxynitrides.

35. The pixel unit structure as claimed in claim 33, wherein a sharp angle or said rough surface is about 1 to 60 degrees.

36. The pixel unit structure as claimed in claim 33, wherein a material of said reflective layer comprises a metal with one of high reflective efficiency and multi-layers.

37. The pixel unit structure as claimed in claim 33, wherein a material of said reflective layer is selected from a group consisting of aluminum (Al), silver (Ag) and a combination thereof.

38. The pixel unit structure as claimed in claim 33, wherein a sharp of said bump layer surface is about 2 to 75 degrees.

39. The pixel unit structure as claimed in claim 33, wherein a material of said bump layer is one of metal material, inorganic material and organic material.

40. The pixel unit structure as claimed in claim 33, wherein a material of said bump layer is one of aluminum (Al), chromium (Cr), MoCr, silicon nitride and silicon oxide.

41. The pixel unit structure s claimed in claim 33, wherein a material of said bump layer is one of resin and organic photoresist.

42. The pixel unit structure as claimed in claim 33, wherein said liquid crystal is a positive-type liquid crystal with a birefringence $\Delta n$ of about 0.055 to 0.12, a retardation (R) $\Delta n \times d_T$ of about 260 nm to 450 nm, and a retardation (R) $\Delta n \times d_R$ of about 205 nm to 345 nm.

43. The pixel unit structure as claimed in claim 33, wherein said liquid crystal is a negative-type liquid crystal with a birefringence $\Delta n$ of about 0.055 to 0.135, a retardation (R) $\Delta n \times d_T$ of about 325 nm to 510 nm, and a retardation (R) $\Delta n \times d_R$ of about 150 nm to 410 nm.

44. The pixel unit structure as claimed in claim 33, wherein said transmitting region has a first distance between the cells and said reflective region has a second distance between the cells, and the distance between said first distance and said second distance is less than 0.6 $\mu$m.

45. The pixel unit structure as claimed in claim 33, wherein said transmitting region has a first area, said reflective region has a second area, and a ratio of said first area to said second area is about 10% to 420%.

46. The pixel unit structure as claimed in claim 45, wherein a pattern of said transmitting region is one of a round pattern, a rectangular pattern and an ellipsoidal pattern.

47. The pixel unit structure as claimed in claim 33, wherein said reflective layer and said gate electrode conductive lines are arranged in a same layer.

48. The pixel unit structure as claimed in claim 33, wherein said reflective layer and said source electrode conductive lines are arranged in a same layer.

49. The pixel unit structure as claimed in claim 33, wherein said structure further comprises a transparent electrode connected with said transistor and located in said display unit.

50. The pixel unit structure as claimed in claim 49, wherein said ultra minimal reflective layer and said transparent electrode are arranged in a same layer.

* * * * *